(12) United States Patent
Kato et al.

(10) Patent No.: US 9,154,212 B2
(45) Date of Patent: Oct. 6, 2015

(54) RADIO TRANSMISSION APPARATUS, RADIO RECEPTION APPARATUS, AND DATA TRANSMISSION METHOD

(71) Applicants: Yasunori Kato, Tokyo (JP); Akihiro Okazaki, Tokyo (JP)

(72) Inventors: Yasunori Kato, Tokyo (JP); Akihiro Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/372,786

(22) PCT Filed: Feb. 26, 2013

(86) PCT No.: PCT/JP2013/055012
§ 371 (c)(1),
(2) Date: Jul. 17, 2014

(87) PCT Pub. No.: WO2013/129422
PCT Pub. Date: Sep. 6, 2013

(65) Prior Publication Data
US 2015/0003554 A1 Jan. 1, 2015

(30) Foreign Application Priority Data
Mar. 2, 2012 (JP) ................. 2012-046744

(51) Int. Cl.
*H04B 7/06* (2006.01)
*H04L 1/06* (2006.01)
*H04L 27/34* (2006.01)

(52) U.S. Cl.
CPC ............ *H04B 7/0697* (2013.01); *H04B 7/0669* (2013.01); *H04L 1/0618* (2013.01); *H04L 27/3416* (2013.01)

(58) Field of Classification Search
CPC ............... H04B 7/0697; H04B 7/0669; H04L 27/3416; H04L 1/0618; H04L 1/0003; H04L 1/0009; H04L 1/0036; H04L 1/0631; H04L 1/208; H04L 25/0226; H04L 25/0236; H04L 25/03318; H04L 25/067; H04L 5/0023
See application file for complete search history.

(56) References Cited

U.S. PATENT DOCUMENTS

2001/0031019 A1  10/2001  Jafarkhani et al.
2003/0072395 A1* 4/2003  Jia et al. .................... 375/341

(Continued)

FOREIGN PATENT DOCUMENTS

WO       01 84739       11/2001
WO    2011 105103        9/2011

OTHER PUBLICATIONS

Himsoon et al., "Single-block differential transmit scheme for broadband wireless MIMO-OFDM systems", IEEE Transactions on Signal Processing, vol. 54, No. 9, pp. 3305-3314, (2006).

(Continued)

*Primary Examiner* — Hirdepal Singh
(74) *Attorney, Agent, or Firm* — Oblon, McClelland, Maier & Neustadt, L.L.P.

(57) ABSTRACT

A radio transmission apparatus includes a plurality of transmission antennas, a start symbol generating unit that generates a start symbol as a reference signal during the start of differential coding, a differential coding unit (a differential coding unit, a transmission-signal-power calculating unit, and a 1/square root operation unit) that subjects a transmission symbol, to which information bits are mapped, to differential coding and generates a symbol after differentiation, and a space-time coding unit that subjects the start symbol or the symbol after differentiation to space-time coding and generates signals to be transmitted from transmission antennas. The differential coding unit determines, on the basis of electric power of the start symbol or electric power of the symbol after differentiation generated last time, electric power of the symbol after differentiation generated in the current differential coding processing.

12 Claims, 5 Drawing Sheets

(56) References Cited

U.S. PATENT DOCUMENTS

| | | | |
|---|---|---|---|
| 2004/0213353 A1* | 10/2004 | Hwang et al. | 375/267 |
| 2006/0274846 A1* | 12/2006 | Bauch | 375/267 |
| 2009/0225809 A1* | 9/2009 | Abou Rjeily | 375/130 |
| 2010/0254300 A1* | 10/2010 | Gulasekaran et al. | 370/315 |
| 2010/0317382 A1* | 12/2010 | Lee et al. | 455/501 |
| 2011/0051835 A1* | 3/2011 | Yuan et al. | 375/267 |
| 2012/0314800 A1 | 12/2012 | Akutagawa et al. | |
| 2013/0291046 A1* | 10/2013 | Ko et al. | 725/116 |
| 2013/0294552 A1* | 11/2013 | Akutagawa et al. | 375/343 |

OTHER PUBLICATIONS

Kato et al., "B-8-3 Improvement of Robustness against Phase Noise with Differential Space-Time Block code", The Institute of Electronics, Information and Communication Engineers Sogo Taikai Koen Ronbunshu 2012 Nen Tsushin (2), p. 257, (2012).

International Search Report Issued May 21, 2013 in PCT/JP13/055012 filed Feb. 26, 2013.

* cited by examiner

RADIO TRANSMISSION APPARATUS, RADIO RECEPTION APPARATUS, AND DATA TRANSMISSION METHOD

FIELD

The present invention relates to a radio transmission apparatus, a radio reception apparatus, and a data transmission method for transmitting and receiving a signal using a plurality of antennas.

BACKGROUND

In a radio communication system, fading involved in movement mainly deteriorates radio communication quality. As a method of reducing the quality deterioration due to the fading, there is known a space-time coded transmission diversity system for arranging a plurality of antennas in a terminal or a base station to reduce a correlation of propagation path fluctuation of each of the antennas and suppressing a decrease in electric power due to fading making use of the difference in the propagation path fluctuation among the antennas. Patent literature 1 discloses a differential space-time coded transmission diversity in which coding based on differential coding, capable of following high-speed propagation path fluctuation compared with a synchronous detection system, is adapted to space-time coding by generating a symbol using, as a change amount on a phase space, transmission information corresponding to transmission bits among continuous symbols. In a radio communication system that performs synchronous detection according to a transmission line estimation result at a frame head, when a long-term frame is used, high oscillator accuracy or high frequency correction accuracy is requested. In the differential coding, information to be transmitted is present in the change amount on the phase space. Therefore, when the differential coding is applied, it is possible to relax oscillator accuracy or frequency correction accuracy.

CITATION LIST

Patent Literature

Patent Literature 1: WO2001/084739

SUMMARY

Technical Problem

However, in the invention disclosed in Patent Literature 1, there are problems explained below because coding is performed assuming a symbol of a constant envelope. Because information is present in a change amount from a block immediately before space-time coding, as a symbol of a head (e.g., a head of a frame) to be differentiated, a reference block (hereinafter referred to as start symbol) needs to be transmitted. However, there is a limitation that mapping same as the inputs to a processing unit, which performs differentiation, is necessary for the start symbol. Further, decoding on a reception side is a maximum likelihood decoding-based method, and thus there is a problem in that a computation amount is enormous when the symbol is multi-valued.

The present invention has been devised in view of the above and it is an object of the present invention to obtain a radio transmission apparatus, a radio reception apparatus, and a data transmission method not having any limitation on the mapping for a start symbol and capable of suppressing a computation amount on a reception side.

Solution to Problem

In order to solve the aforementioned problems, a radio transmission apparatus according to one aspect of the present invention is configured to include: a plurality of transmission antennas; a start-symbol generating unit that generates a start symbol as a reference signal during the start of differential coding; a differential coding unit that subjects a transmission symbol, to which information bits are mapped, to differential coding and generates a symbol after differentiation; and a space-time coding unit that subjects the start symbol or the symbol after differentiation to space-time coding and generates signals to be transmitted from transmission antennas, wherein the differential coding unit determines, on the basis of electric power of the start symbol or electric power of the symbol after differentiation generated last time, electric power of the symbol after differentiation generated in current differential coding processing.

Advantageous Effects of Invention

According to the present invention, there is an effect that it is possible to cope with differential coding for symbols having different amplitudes while obtaining a transmission diversity effect by space-time coding. Further, there is an effect that, on the reception side, demodulation is possible with simple processing irrespective of whether a multi-value number of symbols or the amplitude of transmission symbols is fixed and it is made possible to suppress a computation amount.

DESCRIPTION OF EMBODIMENTS

Embodiments of a radio transmission apparatus, a radio reception apparatus, and a data transmission method according to the present invention are explained in detail below with reference to the drawings. Note that the present invention is not limited by the embodiment.

First Embodiment

Figure 1:
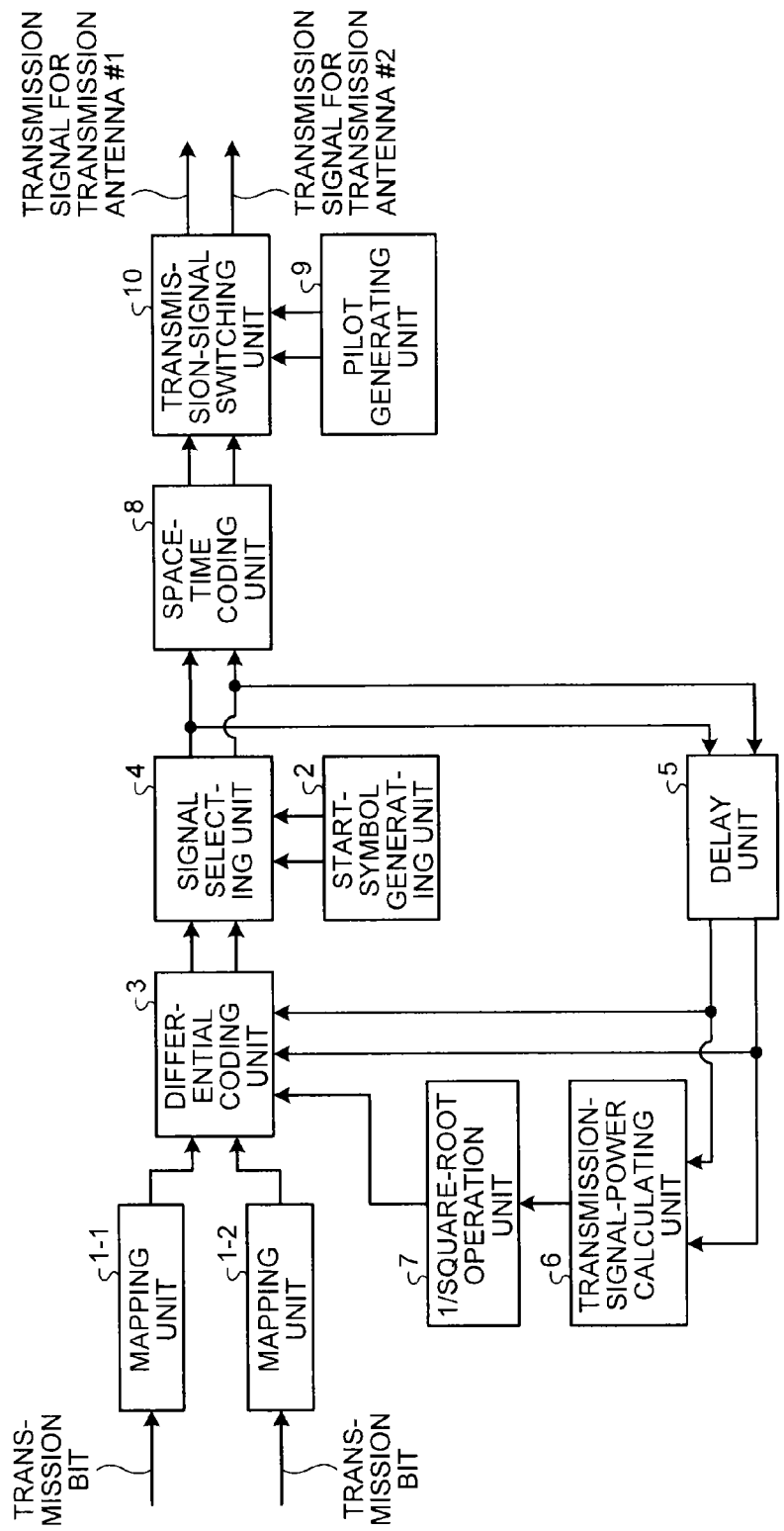
FIG. 1 is a diagram of a configuration example of a modulating unit in a first embodiment.
Figure 2:
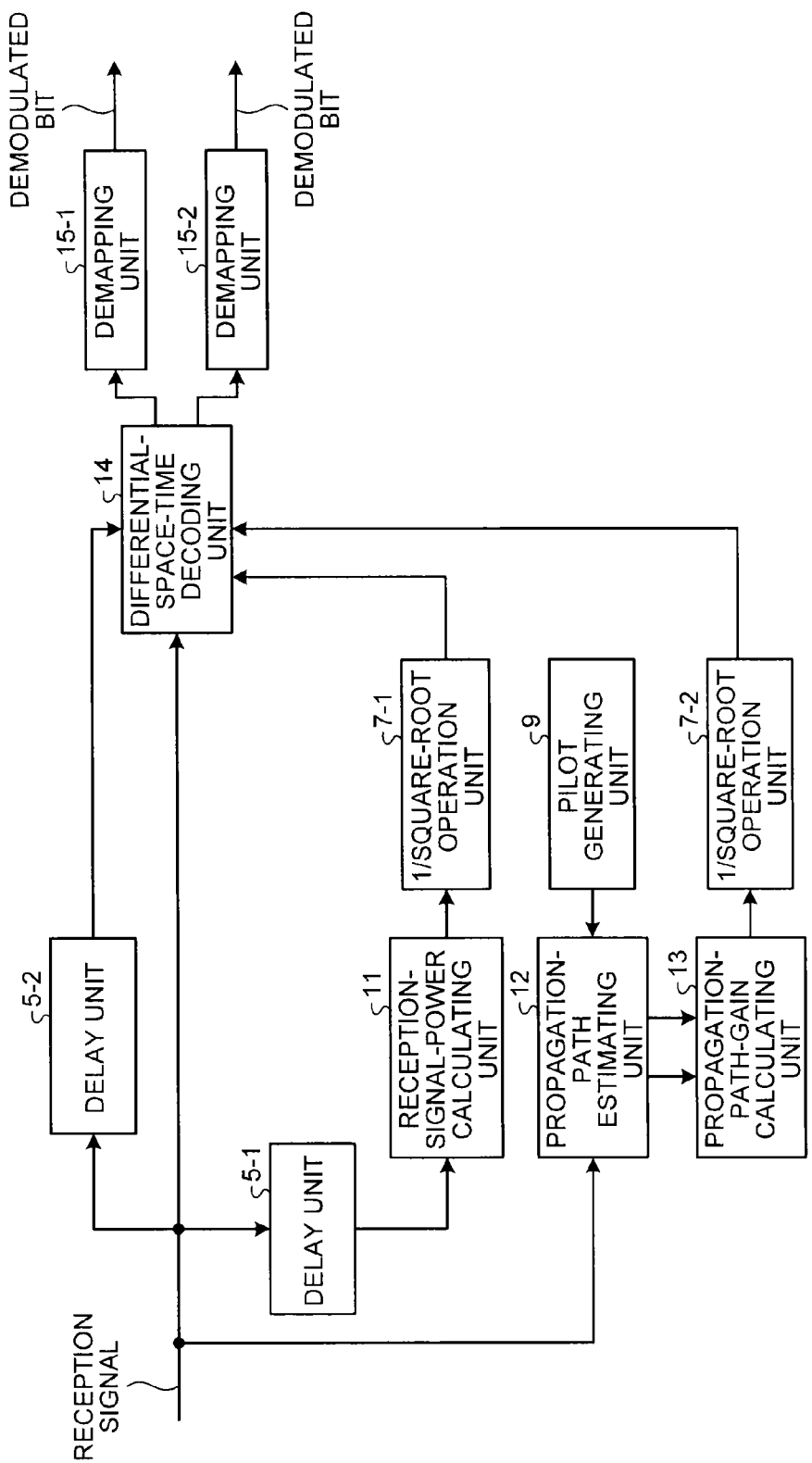
FIG. 2 is a diagram of a configuration example of a demodulating unit in the first embodiment.

FIG. 1 is a diagram of a configuration example of a modulating unit included in a radio transmission apparatus of a radio communication system according to a first embodiment. FIG. 2 is a diagram of a configuration example of a demodulating unit included in a radio reception apparatus of the radio communication system in the first embodiment. Note that, in FIG. 1 and FIG. 2, filters, amplifiers, frequency converters, analog/digital converters, digital/analog converters, and the like necessary for radio transmission/reception apparatuses are not shown. The radio transmission apparatus configures a communication apparatus on the transmission side. The radio reception apparatus configures a communication apparatus on the reception side. The radio transmission apparatus includes two transmission antennas (transmission antennas #1 and #2). The radio reception apparatus includes one reception antenna.

As shown in FIG. 1, the modulating unit includes mapping units 1-1 and 1-2 that map a transmission bit string to arbitrary points on a phase space and generate and output transmission symbols, a start-symbol generating unit 2 that generates a start symbol in performing differential coding, a differential coding unit 3 that performs the differential coding using a transmission symbol subjected to the differential coding in the past or the start symbol and the transmission symbols input from the mapping units 1-1 and 1-2, a signal selecting unit 4 that selects and outputs either one of the start symbol output from the start-symbol generating unit 2 and a transmission symbol after differentiation (a symbol after differentiation) output from the differential coding unit 3, a delay unit 5 that delays a transmission signal, which is a signal output from the signal selecting unit 4, a transmission-signal-power calculating unit 6 that calculates electric power of the transmission signal delayed by the delay unit 5, a 1/square-root operation unit 7 that calculates a 1/square root of the transmission signal power calculated by the transmission-signal-power calculating unit 6, a space-time coding unit 8 that executes space-time coding on the transmission signal output from the signal selecting unit 4, a pilot generating unit 9 that generates a pilot signal, and a transmission-signal switching unit 10 that switches the pilot signal and the transmission signal after the space-time coding and outputs a signal to be transmitted from each of transmission antennas #1 and #2 not shown in the figure. Note that the differential coding unit 3, the transmission-signal-power calculating unit 6, and the 1/square-root operation unit 7 operate as a differential coding unit.

As shown in FIG. 2, the demodulating unit includes delay units 5-1 and 5-2 that delay a reception signal received by a reception antenna not shown in the figure, a reception-signal-power calculating unit 11 that calculates electric power of the reception signal (the reception signal after being delayed) output from the delay unit 5-1, a 1/square-root operation 7-1 that calculates a 1/square root of the reception signal power output from the reception-signal-power calculating unit 11, a pilot generating unit 9 same as the pilot generating unit 9 included in the transmitting unit shown in FIG. 1, a propagation-path estimating unit 12 that estimates, on the basis of the pilot signal output from the pilot generating unit 9 and the reception signal, a propagation path response (an amplitude fluctuation amount or a phase and amplitude fluctuation amount) by a propagation path (not shown in the figure), a propagation-path-gain calculating unit 13 that calculates a propagation path gain from the propagation path response estimated by the propagation-path estimating unit 12, a 1/square-root operation unit 7-2 that calculates a 1/square root of the propagation path gain calculated by the propagation-path-gain calculating unit 13, a differential-space-time decoding unit 14 that performs a differential space-time decoding operation using the reception signal and an operation result in the 1/square-root operation unit 7-1, and demapping units 15-1 and 15-2 that convert two signals after the differential space-time decoding, which are output signals from the differential-space-time decoding unit 14, into transmission bit estimated values on the basis of signal point positions on a phase space and outputs the transmission bit estimated values as demodulated bits. Note that the delay units 5-1 and 5-2, the 1/square-root operation units 7-1 and 7-2, the reception-signal-power calculating unit 11, the propagation-path estimating unit 12, the propagation-path-gain calculating unit 13, and the differential-space-time decoding unit 14 operate as a transmission-symbol estimating unit.

<Operation of the Modulating Unit>

The operation of the demodulating unit shown in FIG. 1 is explained in detail below.

(Operation of the Mapping Units 1-1 and 1-2)

The mapping units 1-1 and 1-2 divide an input transmission bit string into combinations of 1 bit or more and output, as transmission symbols, I/Q amplitude values (points on an I/Q quadrature phase space having I/Q amplitudes are referred to as symbols) of mapping points where the combinations of the bit strings after the division and arrangement points on the I/Q quadrature phase space correspond to each other in a one-to-one relation.

Figure 3:
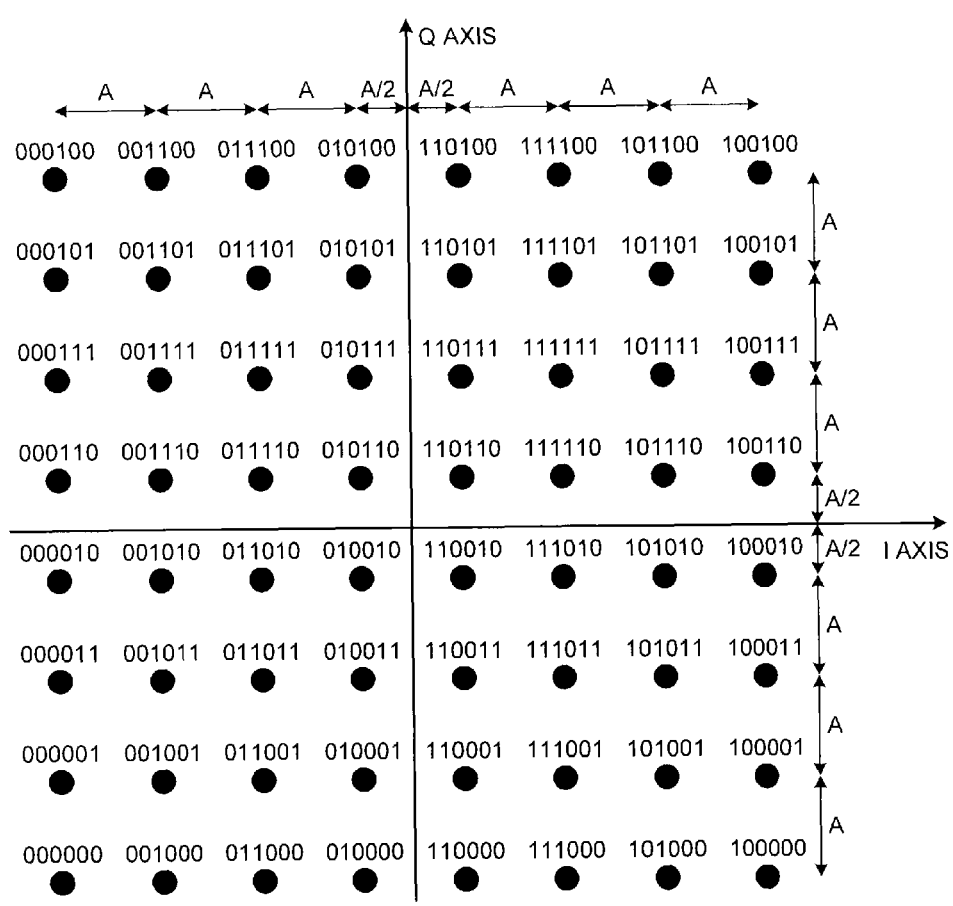
FIG. 3 is a diagram of signal points of 60QAM.

As an example of mapping, 64QAM (Quadrature Amplitude Modulation) is shown in FIG. 3 in which a transmission bit string is divided into combinations of 6 bits each and the transmission bit strings of 6 bits each are arranged at 64 mapping points when a minimum distance among the mapping points is set to A. In this way, concerning the mapping points, a power value does not have to be fixed and can take a plurality of power values. Other mapping arrangements such as 32QAM, 16QAM, and QPSK (Quadrature Phase Shift Keying) other than 64QAM can be adopted.

(Operation in Post Stages of the Mapping Units 1-1 and 1-2)

First, operations before the time t=0 are explained. Note that the start time of a modulation operation is set as the time t=0. Now, an operation at the time t=−1 is explained first.

At time t=−1, the pilot generating unit 9 generates a pilot signal for the transmission antenna #1 and a pilot signal for the transmission antenna #2 and outputs the pilot signals respectively to the transmission antennas. The pilot signals to be generated are signals for measuring, on the reception side, propagation path fluctuation between the transmission antenna #1 and the reception antenna and propagation path fluctuation between the transmission antenna #2 and the reception antenna. It is desirable that the pilot signals transmitted from both the transmission antennas are orthogonal to each other according to frequencies, times or signs, or arbitrary combinations of the frequencies, the times, and the signs.

The transmission-signal switching unit 10 selects and outputs, as transmission signals for the transmission antennas #1 and #2, the pilot signals for the antennas generated by the pilot generating unit 9. The transmission signals (the pilot signals) output from the transmission-signal switching unit 10 are transmitted from the transmission antennas.

An operation at the times t=0 and 1 is explained.

At the time t=0, the start-symbol generating unit 2 generates two start symbols $x_0$ and $x_1$ having arbitrary I/Q amplitude values. The start symbols can be the mapping points on the I/Q quadrature phase space used in the mapping by the mapping unit 1 or can be arbitrary I/Q amplitude values not used in the mapping by the mapping unit 1. However, the two start symbols are not 0 (although electric power of one of the start symbols can be 0).

The signal selecting unit 4 selects and outputs the two start symbols $x_0$ and $x_1$ output by the start-symbol generating unit 2. The start symbols selected by the signal selecting unit 4 are input to the space-time coding unit 8 and the delay unit 5.

The space-time coding unit 8 applies space-time coding to the input two symbols $x_i$ and $x_{i+1}$ (in the case of the start symbols, i=0; i is a positive even number). Specifically, the space-time coding unit 8 outputs $x_i$ at the time t=i and outputs $x_{i+1}$ at the time t=i+1 as the signals for the transmission antenna #1 and outputs $-x_{i+1}^*$ at the time t=i and outputs $x_i^*$ at the time t=i+1 as signals for the transmission antenna #2 using two time slots (time slots of time t=0 and time t=1).

That is, when the start symbols $x_0$ and $x_1$ are input, the space-time coding unit 8 outputs $x_0$ at time t=0 and outputs $x_1$ at time t=1 as the signals for the transmission antenna #1 and outputs $-x_1^*$ at time t=0 and outputs $x_0^*$ at time t=1 as the signals for the transmission antenna #2. Note that (•)* means complex conjugate of (•).

Here, it is assumed that the space-time coding with respect to the inputs of the two symbols is performed using the two time slots. However, the space-time coding using two or more time slots can also be applied.

The transmission-signal switching unit 10 outputs the outputs of the space-time coding unit 8 to the transmission antennas #1 and #2 as transmission signals from the time t=0 onward.

The delay unit 5 delays the signals output from the signal selecting unit 4 by the number of time slots used in the space-time coding performed by the space-time coding unit 8. That is, in this embodiment, the delay unit 5 delays the signals by two time slots.

An operation from the time t=2 onward is explained.

The two start symbols $x_0$ and $x_1$ input to the delay unit 5 at time t=0 are input to the transmission-signal-power calculating unit 6 and the differential coding unit 3 at time t=2.

The transmission-signal power calculating unit 6 calculates a power sum $|x_0|^2+|x_1|^2$ concerning the input two start symbols $x_0$ and $x_1$ and outputs the power sum $|x_0|^2+|x_2|^2$ to the 1/square-root operation unit 7. The 1/square-root operation unit 7 calculates $1/\text{sqrt}(|x_0|^2+|x_1|^2)$ from the input power sum and outputs $1/\text{sqrt}(|x_0|^2+|x_1|^2)$. Note that |(•)| means an absolute value of (•) and sqrt(•) means a square root of (•).

At the time t=2, the differential coding unit 3 applies differentiation processing indicated by the following Formula (1-1) and Formula (1-2) to transmission symbols $s_2$ and $s_3$ generated by the mapping units 1-1 and 1-2 and outputs symbols after differentiation $x_2$ and $x_3$ obtained as a result of the differentiation processing. In Formula (1-1) and Formula (1-2), i=2 at the time t=2. $1/\text{sqrt}(|x_0|^2+|x_1|^2)$ is an output value of the 1/square-root operation unit 7.

[Math 1]

$$x_i = \frac{1}{sqrt(|x_{i-2}|^2 + |x_{i-1}|^2)} (s_{i-2} x_{i-2} - s_{i-1} x_{i-1}) \quad (1\text{-}1)$$

$$x_{i+1} = \frac{1}{sqrt(|x_{i-2}|^2 + |x_{i-1}|^2)} (s_{i-2}^* x_{i-1} + s_{i-1}^* x_{i-2}) \quad (1\text{-}2)$$

At time t=2 and subsequent time, the signal selecting unit 4 selects the symbols after differentiation output from the differential coding unit 3. Therefore, the symbols after differentiation $x_2$ and $x_3$ are input to the space-time coding unit 8. The space-time coding unit 8 performs the space-time coding processing as at the time t=0. That is, the space-time coding unit 8 outputs $x_2$ at the time t=2 and outputs $x_3$ at the time t=3 as signals for the transmission antenna #1 and outputs $-x_3^*$ at the time t=2 and outputs $x_2^*$ at the time t=3 as signals for the transmission antenna #2.

Similarly, at the time t=i, the differential coding unit 3 calculates symbols after differentiation $x_i$ and $x_{i-1}$ according to Formula (1-1) and Formula (1-2) using 1/square root of a power sum of symbols after differentiation $x_{i-1}$ and $x_{i-2}$ and symbols after differentiation $x_{i-1}$ and $x_{i-2}$ at time t=i-2. The signal selecting unit 4 selects signals output from the differential coding unit 3 and outputs the signals to the space-time coding unit 8. The space-time coding unit 8 outputs $x_i$ at the time t=i and outputs $x_{i+1}$ at the time t=i+1 as signals for the transmission antenna #1, and outputs $-x_{i+1}^*$ at the time t=i and outputs $x_i^*$ at the time t=i+1 as signals for the transmission antenna #2.

The modulating unit operates as explained above. Consequently, it is possible to simultaneously perform the differential coding and the space-time coding. Information concerning transmission symbols is transmitted according to one or both of amplitudes and phases of the symbols after differentiation at the time t=i and the symbols after differentiation at the time t=i-2.

When a normalization coefficient $(1/\text{sqrt}(|x_0|^2+|x_1|^2)$ is not present in Formula (1-1) and Formula (1-2), in an example of a multi-value QAM in which there is a power difference between transmission symbols, when transmission symbols having electric power smaller than average electric power of all mapping points of the multi-value QAM are continuously input to the differential coding unit 3, electric power of the symbols after differentiation increases and, when transmission symbols having large electric power are continuously input to the differential coding section 3, the electric power of the symbols after differentiation decreases, and dispersion of the electric power of the symbols after differentiation expands. Therefore, the expansion of the power dispersion of the symbols after differentiation is suppressed by normalizing the electric power of the symbols after differentiation (the symbols after differentiation at t=i) using a 1/square root of a power sum of symbols after differentiation of preceding two slots (symbols after differentiation at the time t=i-2 preceding symbols after differentiation at time t=i).

Note that, in the example explained in this embodiment, the start symbols are output to the transmission antennas #1 and #2 (transmitted from the transmission antennas #1 and #2) only at the time t=0. However, the start symbols can be cyclically inserted in units of frames or the like.

<Operation of the Demodulating Unit>

The operation of the demodulating unit shown in FIG. 2 is explained in detail below.

Note that it is assumed that the signals output from the modulating unit are transmitted from the transmission antennas #1 and #2 and input to the demodulating unit through the propagation path as the reception signals at the same time.

First, at the time t=-1, the pilot generating unit 9 generates a pilot signal common to the modulating unit (a pilot signal same as the pilot signal generated by the pilot generating unit 9 of the modulating unit).

The propagation-path estimating unit 12 calculates amplitude or both of amplitude and a phase as a propagation path response on the basis of the pilot signal output from the pilot generating unit 9 and a reception signal at the time t=-1. As the propagation path response, the propagation-path estimating unit 12 independently calculates a propagation path response $C_1$ between the transmission antenna #1 and the reception antenna and a propagation path response $C_2$ between the transmission antenna #2 and the reception antenna. The amplitude and the phase of the transmissions path response to be output can be I/Q amplitude values on the I/Q quadrature space or can be represented by a phase rotation angle and amplitude.

The propagation path responses $C_1$ and $C_2$ calculated by the propagation-path estimating unit 12 are input to the propagation-path-gain calculating unit 13. The propagation-path-gain calculating unit 13 calculates a sum $|C_1|^2+|C_2|^2$ of propagation path gains.

The sum of the propagation path gains calculated by the propagation-path-gain calculating unit 13 is input to the 1/square-root operation unit 7-2. The 1/square-root operation unit 7-2 calculates a 1/square root concerning the input sum of the propagation path gains, specifically, $1/\sqrt{(|C_1|^2+|C_2|^2)}$. The calculation result is input to the differential-space-time decoding unit 14.

An operation at times t=0 and 1 is explained.

Signals $r_0$ and $r_1$ received by the reception antenna at the times t=0 and 1 are obtained by multiplying the start symbols generated and transmitted by the modulating unit at the time t=0 with the propagation path responses. The reception signals $r_0$ and $r_1$ are input to the delay units 5-1 and 5-2. The delay units 5-1 and 5-2 delay the reception signals $r_0$ and $r_1$ by the number of time slots (in this embodiment, two time slots) used in the space-time coding in the space-time coding unit 8 of the modulating unit.

An operation at the times t=2 and 3 is explained.

The reception signals $r_0$ and $r_1$ delayed by the delay unit 5-1 are input to the reception-signal-power calculating unit 11. The reception-signal-power calculating unit 11 calculates a reception signal power sum $|r_0|^2+|r_1|^2$ equivalent to the two time slots.

The 1/square-root operation unit 7-1 calculates a 1/square root of the reception signal power sum $|r_0|^2+|r_1|^2$ calculated by the reception-signal-power calculating unit 11, that is, $1/\sqrt{(|r_0|^2+|r_1|^2)}$.

In parallel to this processing, the reception antenna receives signals $r_2$ and $r_3$. The reception signals at the respective times can be represented as indicated by the following Formula (2) using the transmission path responses $C_1$ and $C_2$. Note that noise is omitted in Formula (2).

[Math 2]

$$r_{i+0}=C_1 x_{i+0}-C_2 x_{i+1}^*$$

$$r_{i+1}=C_1 x_{i+1}+C_2 x_{i+0}^*$$

$$r_{i+2}=C_1 x_{i+2}-C_2 x_{i+3}^*$$

$$r_{i+3}=C_1 x_{i+3}+C_2 x_{i+2}^* \quad (2)$$

The reception signals that can be represented as indicated by Formula (2) can be obtained by the differential-space-time decoding unit 14 as estimated transmission symbols $s'_i$ and $s'_{i+1}$ on the basis of $r_0$ and $r_1$ received at the times t=0 and 1 and delayed by the delay unit 5-2, the reception signals $r_2$ and $r_3$ received at the times t=2 and 3, the output $1/\sqrt{(|r_1|^2+|r_1|^2)}$ of the 1/square-root operation unit 7-1, the $1/\sqrt{(|C_1|^2+|C_2|^2)}$ of the 1/square-root operation unit 7-2, and the following Formula (3-1) and Formula (3-2). In Formula (3-1) and Formula (3-2), i=2 at times t=2 and 3.

[Math 3]

$$s'_{i+0} = \frac{1}{sqrt(|C_1|^2+|C_2|^2)} \frac{1}{sqrt(|r_{i-2}|^2+|r_{i-1}|^2)} (r_{i-2}^* r_{i+0} + r_{i-1} r_{i+1}^*) \quad (3\text{-}1)$$

$$s'_{i+1} = \frac{1}{sqrt(|C_1|^2+|C_2|^2)} \frac{1}{sqrt(|r_{i-2}|^2+|r_{i-1}|^2)} (r_{i-2} r_{i+1}^* - r_{i-1}^* r_{i+0}) \quad (3\text{-}2)$$

An output (a decoding result) of the differential-space-time decoding unit 14 obtained by Formula (3-1) and Formula (3-2) is input to the demapping units 15-1 and 15-2. The demapping units 15-1 and 15-2 check the decoding result and, assuming that a mapping point closest in a transmission mapping point arrangement is transmitted, converts the decoding result into a bit string (restores a transmitted bit string).

An operation from the times t=4 and 5 onward is explained.

At the times t=4 and 5, differential space-time decoding is performed on the basis of reception signals $r_4$ and $r_5$ at respective times and the reception signals $r_2$ and $r_3$ received at the time t=2 and t=3 and delayed by the delay unit 5-2.

If the propagation path fluctuation is gentle, there is little fluctuation in a propagation path gain. A propagation path gain calculated at the time t=-1 can be used.

Thereafter, processing is performed in the same manner as at the times t=2 and t=3. That is, in the differential space-time decoding at the times t=4 and t=5, using Formula (3-1) and Formula (3-2), with i=4, estimated transmission symbols $s'_4$ and $s'_5$ can be obtained on the basis of $r_2$ and $r_3$ received at the times t=2 and 3 and delayed by the delay unit 5-2, the reception signals $r_4$ and $r_5$ received at the times t=4 and 5, the output $1/\sqrt{(|r_2|^2+|r_3|^2)}$ of the 1/square-root operation unit 7-1, and the $1/\sqrt{(|C_2|^2+|C_2|^2)}$ of the 1/square-root operation unit 7-2. The demapping units 15-1 and 15-2 convert the estimated transmission symbols $s'_4$ and $s'_5$ into bit strings. Demodulation processing from the time t=6 onward is the same.

As explained above, in this embodiment, on the transmission side, immediately after the start of the demodulation processing, a non-zero predetermined start symbol and a non-zero transmission symbol, electric powers of which are not zero (electric power of one of the start symbol and the transmission symbols can be 0) are subjected to the differential coding and further subjected to the space-time coding to generate transmission signals. After the differential coding is performed, a normalization coefficient is calculated on the basis of symbols after differentiation obtained by the differential coding in the past. The symbols after differentiation and the transmission symbols are subjected to the differential coding and electric powers of the symbols after differentiation and the transmission symbols are normalized. The symbols after differentiation and the transmission symbols are further subjected to the space-time coding to generate transmission signals. Consequently, it is possible to cope with the differential coding for symbols having different amplitudes while obtaining a two-antenna transmission diversity effect by the space-time coding. On the reception side, demodulation is made possible with simple processing irrespective of whether a multi-value number of symbols or the amplitude of transmission symbols is fixed and it is possible to suppress a computation amount.

In this embodiment, the differential coding is performed according to Formula (1-1) and Formula (1-2). Therefore, there is no limitation on the start symbols $x_0$ and $x_1$. Note that it is desirable that the electric power of the start symbol is equal to average electric power of the transmission symbols.

In the explanation in this embodiment, the pilot signal is arranged at the head of the frame. However, it is also possible to arrange the pilot signal at the end of the frame, in the middle of the frame, or in two or more frames once. In the modulating unit and the demodulating unit, error correction coding and decoding (turbo coding and decoding, LDPC coding and decoding, convolution coding and Viterbi decoding, Reed-Solomon coding and decoding, etc.) are not used. However, the error correction coding and decoding can be carried out for transmission bits of the modulating unit and demodulation bits of the demodulating unit.

Second Embodiment

Figure 4:
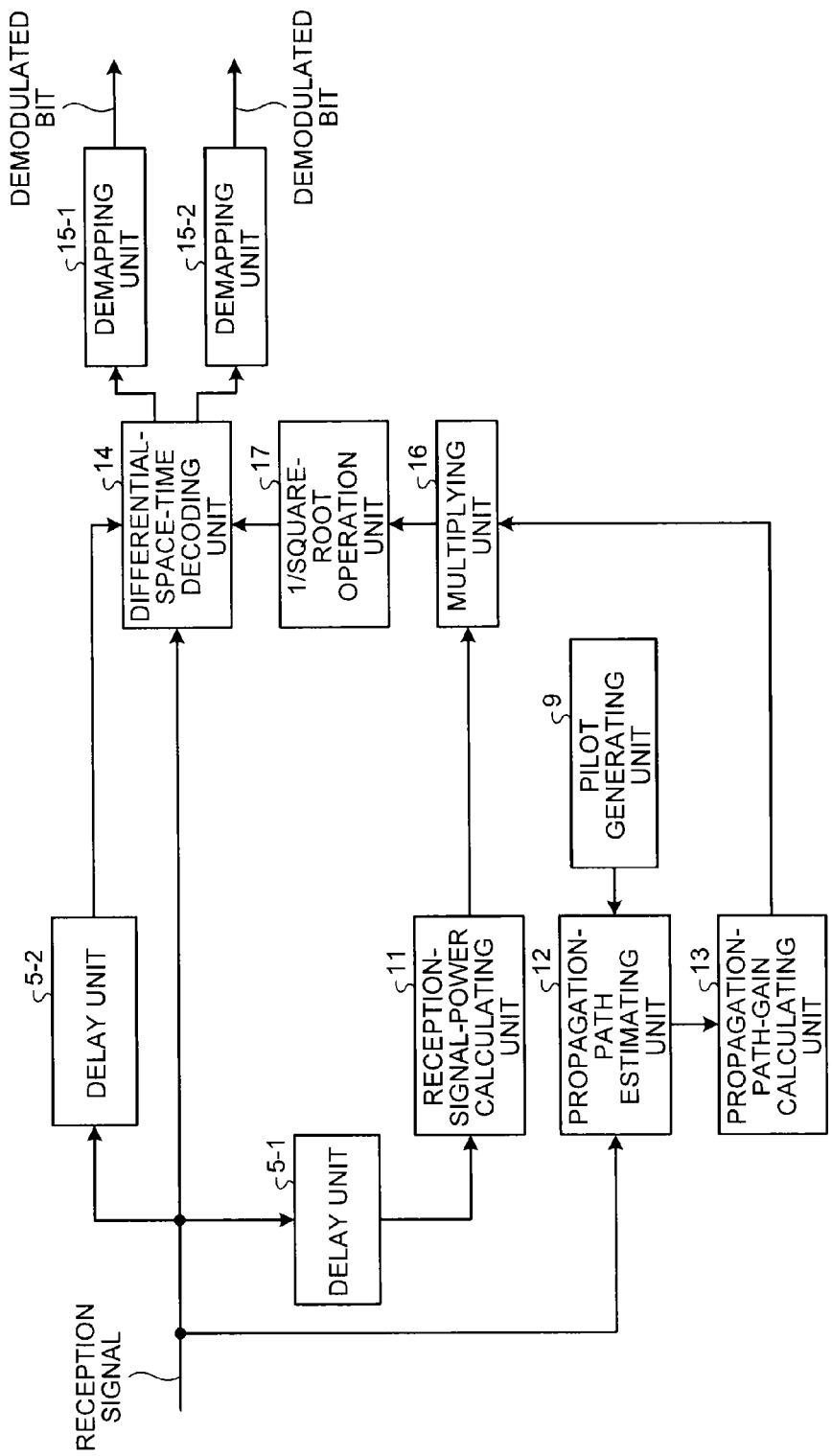
FIG. 4 is a diagram of a configuration example of a demodulating unit in a second embodiment.

FIG. 4 is a diagram of a configuration example of the demodulating unit in a second embodiment. In this embodiment, a modification of the demodulating unit explained in the first embodiment is explained. Note that, in FIG. 4, components common to the demodulating unit in the first embodiment (see FIG. 2) are denoted by the same reference numerals. In this embodiment, only differences from the first embodiment are explained. It is assumed that a modulating unit included in a transmission side of a signal is the same as the modulating unit in the first embodiment.

In the demodulating unit in this embodiment, the 1/square-root operation units 7-1 and 7-2 included in the demodulating unit in the first embodiment are replaced with a multiplying unit 16 and a 1/square-root operation unit 17.

The multiplying unit 16 multiplies together reception signal power calculated by the reception-signal-power calculating unit 11 and a propagation path gain calculated by the propagation-path-gain calculating unit 13. The 1/square-root operation unit 17 calculates a 1/square root of a result of the multiplication. The calculation result is input to the differential-space-time decoding unit 14.

In the demodulating unit in the first embodiment shown in FIG. 2, the 1/square-root operation units 7-1 and 7-2 respectively calculate 1/square roots of the electric power of the reception signal calculated by the reception-signal-power calculating unit 11 and the propagation path gain calculated by the propagation-path-gain calculating unit 13, and a calculation result is multiplied in the differential-space-time decoding unit 14. Contrary to this, in the demodulating unit in this embodiment, as shown in FIG. 4, the multiplying unit 16 multiplies together an output of the reception-signal-power calculating unit 11 and an output of the propagation-path-gain calculating unit 13, and thereafter, the 1/square-root operation unit 17 calculates a 1/square root.

By adopting the configuration in this embodiment, it is possible to reduce the number of executions of the squire root operation and the reciprocal operation at which an FPGA (Field-Programmable Gate Array) is weak.

Third Embodiment

Figure 5:
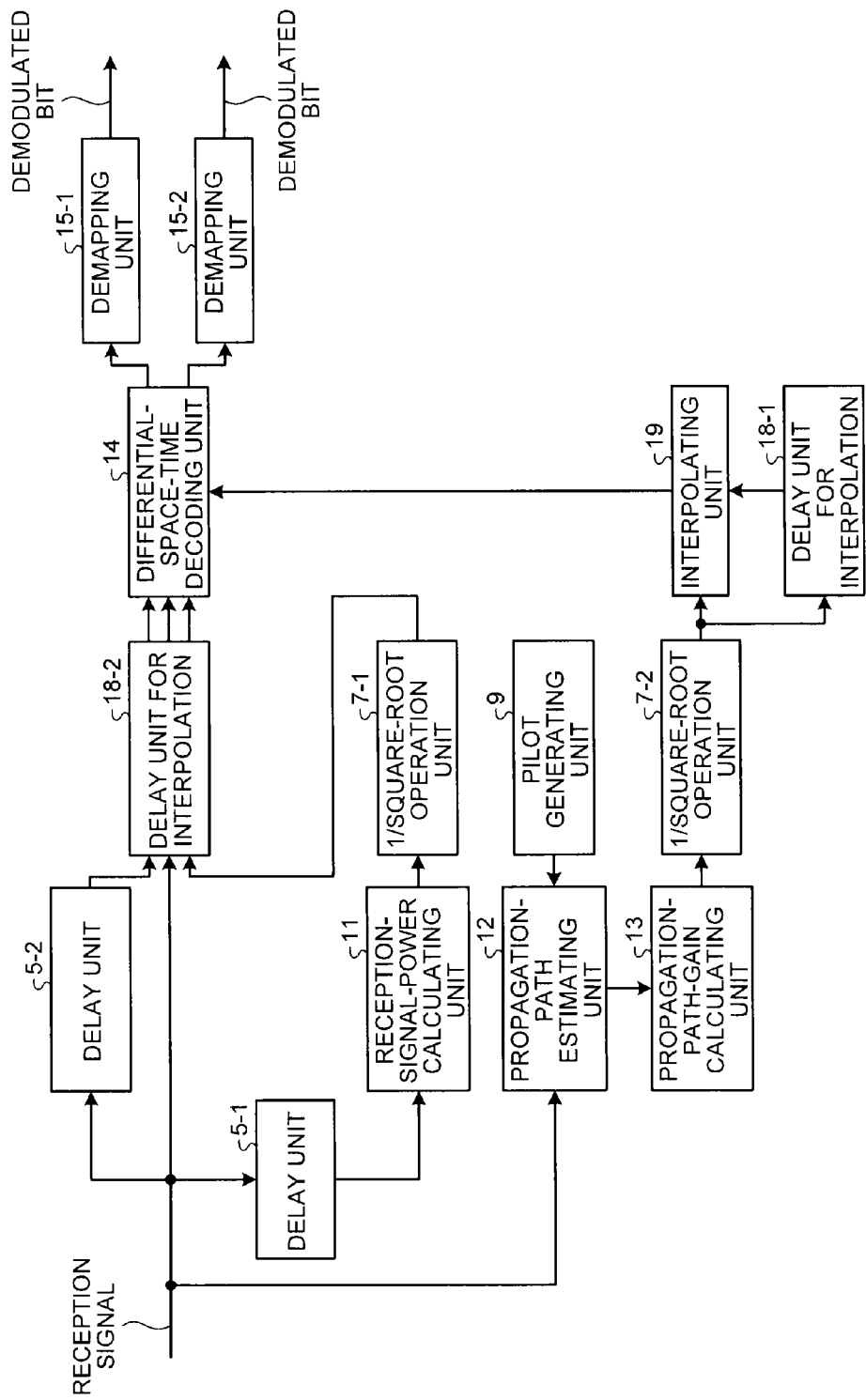
FIG. 5 is a diagram of a configuration example of a demodulating unit in a third embodiment.

FIG. 5 is a diagram of a configuration example of a demodulating unit in a third embodiment. As in the second embodiment, a modification of the demodulating unit explained in the first embodiment is explained. Note that, in FIG. 5, components common to the demodulating unit in the first embodiment (see FIG. 2) are denoted by the same reference numerals. In this embodiment, only differences from the first embodiment are explained. It is assumed that a modulating unit included in a signal transmission side is the same as the modulating unit in the first embodiment.

In the demodulating unit in this embodiment, delay units for interpolation 18-1 and 18-2 and an interpolating unit 19 are added to the demodulating unit in the first embodiment.

The delay units for interpolation 18-1 and 18-2 delay an input signal for a fixed time and then outputs the signal. The interpolating unit 19 applies interpolation processing to an output (a 1/square root of a propagation path gain) from the 1/square-root operation unit 7-2.

In the demodulating unit in the first embodiment shown in FIG. 2, the 1/square-root operation units 7-1 and 7-2 respectively calculate 1/square roots of the electric power of the reception signal calculated by the reception-signal-power calculating unit 11 and the propagation path gain calculated by the propagation-path-gain calculating unit 13, and a calculation result is multiplied in the differential-space-time decoding unit 14. Contrary to this, in the demodulating unit in this embodiment, a 1/square-root ($1/\mathrm{sqrt}(|C_1|^2+|C_2|^2)$) of a propagation path gain, which is an output of the 1/square-root operation unit 7-2, is input to the interpolating unit 19 and the delay unit for interpolation 18-1. The operation of the demodulating unit in this embodiment is explained in detail below. Note that it is assumed that a pilot signal is arranged at the head of a frame.

When a propagation path response between a transmission antenna #1 and a reception antenna in a first frame (not shown in the figure) is represented as $C_1^1$ and a propagation path response between a transmission antenna #2 and the reception antenna is represented as $C_2^1$, a 1/square-root of a propagation path gain, which is an output of the 1/square-root operation unit 7-2, that is, $1/\mathrm{sqrt}(|C_1^1|^2+|C_2^1|^2)$ is delayed by the delay unit for interpolation 18-1 by time slots equivalent to one frame.

When a propagation path response between the transmission antenna #1 and the reception antenna in a second frame (not shown in the figure) is represented as $C_1^2$ and a propagation path response between the transmission antenna #2 and the reception antenna is represented as $C_2^2$, a 1/square-root of a propagation path gain, which is an output of the 1/square-root operation unit 7-2, that is, $1/\mathrm{sqrt}(|C_1^2|^2+|C_2^2|^2)$ is input to the interpolating unit 19.

The interpolating unit 19 calculates fluctuation in a gain in the first frame through interpolation using $1/\mathrm{sqrt}(|C_1^1|^2+|C_2^1|^2)$, which is the 1/square-root of the propagation path gain of the first frame, and $1/\mathrm{sqrt}(|C_1^2|^2+|C_2^2|^2)$, which is the 1/square-root of the propagation path gain of the second frame. In this case, as an interpolation method to be used, for example, liner interpolation and polynomial interpolation are conceivable. In this embodiment, transmission line gains during transmission of two pilot signals are interpolated using propagation path gains respectively calculated on the basis of the two pilot signals. However, the propagation path gains can be interpolated or averaged using two or more pilot signals.

The delay unit for interpolation 18-2 delays an output of the 1/square-root operation unit 7-1, an output of the delay unit 5-2, and a reception signal by time slots equivalent to one frame.

As explained above, the demodulating unit in this embodiment calculates the transmission line gain using the two or more pilot signals. Therefore, it is possible to improve demodulation performance under a condition in which a transmission line gain greatly fluctuates in a frame.

Note that, in this embodiment, the demodulating unit in the first embodiment is modified to calculate the transmission line gain using the two or more pilot signals (calculate, through the interpolation processing, a transmission line gain in a section in which a pilot signal is not transmitted). However, the demodulating unit in the second embodiment can be modified in the same manner.

In the explanation in the embodiments, the reception antenna on the reception side is one antenna. However, a plurality of the reception antennas can be provided. Signals received by the reception antennas can be diversity-combined.

INDUSTRIAL APPLICABILITY

As explained above, the radio transmission apparatus according to the present invention is useful for a radio communication system to which a differential coding is applied.

REFERENCE SIGNS LIST 1-1, 1-2 Mapping units
2 Start-symbol generating unit
3 Differential coding unit
4 Signal selecting unit
5 Delay unit
6 Transmission-signal-power calculating unit
7, 7-1, 7-2, 17 1/square-root operation units
8 Space-time coding unit
9 Pilot generating unit
10 Transmission-signal switching unit
11 Reception-signal-power calculating unit
12 Propagation-path estimating unit
13 Propagation-path-gain calculating unit
14 Differential-space-time decoding unit
15-1, 15-2 Demapping units
16 Multiplying unit
18-1, 18-2 Delay units for interpolation
19 Interpolating unit

The invention claimed is:

1. A radio transmission apparatus comprising:
a plurality of transmission antennas;
a start-symbol generating unit that generates a start symbol as a reference signal during a start of differential coding;
a differential coding unit that subjects a transmission symbol, to which information bits are mapped, to differential coding and generates a symbol after differentiation; and
a space-time coding unit that subjects the start symbol or the symbol after differentiation to space-time coding and generates signals to be transmitted from transmission antennas, wherein
the differential coding unit determines, on the basis of electric power of the start symbol or electric power of the symbol after differentiation generated last time, electric power of the symbol after differentiation generated in the current differential coding processing,
wherein the differential coding unit includes:
a unit that calculates electric power of the start symbol or the symbol after differentiation generated last time;
a unit that calculates 1/square-root of the electric power; and
a unit that generates the symbol after differentiation on the basis of the transmission symbol, the start symbol or the symbol after differentiation generated last time, and the 1/square-root of the electric power.

2. The radio transmission apparatus according to claim 1, wherein the space-time coding unit performs the space-time coding targeting the symbol after differentiation when the symbol after differentiation-generated by the differential coding unit is present and targeting the start symbol when the symbol after differentiation generated by the differential coding unit is not present.

3. The radio transmission apparatus according to claim 1, wherein
When the number of the transmission antennas is two, time indicating a time slot number is represented by i, the transmission symbol at the time i is represented as $s_i$, the symbol after differentiation at the time i is represented as $x_i$, sqrt(•) represents a square root of (•), and (•)* represents complex conjugate of (•),
the differential coding unit subjects the transmission symbol to the differential coding according to Formula (1), $$x_i = \frac{1}{sqrt(|x_{i-2}|^2 + |x_{i-1}|^2)}(s_{i-2}x_{i-2} - s_{i-1}x_{i-1}) \quad (1)$$

$$x_{i+1} = \frac{1}{sqrt(|x_{i-2}|^2 + |x_{i-1}|^2)}(s^*_{i-2}x_{i-1} + s^*_{i-1}x_{i-2})$$

the space-time coding unit subjects the symbol after differentiation to the space-time coding according to Formula (2), $$\begin{pmatrix} x_i & x_{i+1} \\ -x^*_{i+1} & x^*_i \end{pmatrix} \quad (2)$$

at time i, $x_i$ is transmitted from a first transmission antenna and $-x_{i+1}$* is transmitted from a second transmission antenna, and
at time i+1, $x_{i+1}$ is transmitted from the first transmission antenna and $x_i$* is transmitted from the second transmission antenna.

4. A radio reception apparatus that receives a signal transmitted by the radio transmission apparatus according to claim 3, the radio reception apparatus comprising:
a transmission-symbol estimating unit that estimates, according to Formula (3), a transmission symbol generated by the radio transmission apparatus and outputs the transmission symbol as an estimated transmission symbol $s'_i$, C represents propagation path responses, and r represents reception signals; and $$s'_{i+0} = \frac{1}{sqrt(|C_1|^2 + |C_2|^2)} \frac{1}{sqrt(|r_{i-2}|^2 + |r_{i-1}|^2)}(r^*_{i-2}r_{i+0} + r_{i-1}r^*_{i+1}) \quad (3)$$

$$s'_{i+1} = \frac{1}{sqrt(|C_1|^2 + |C_2|^2)} \frac{1}{sqrt(|r_{i-2}|^2 + |r_{i-1}|^2)}(r_{i-2}r^*_{i+1} - r^*_{i-1}r_{i+0})$$

a demapping unit that demaps the estimated transmission symbol and restores information bit transmitted from the radio transmission apparatus.

5. The radio reception apparatus according to claim 4, wherein the transmission-symbol estimating unit includes:
a propagation-path estimating unit that independently estimates a propagation path response for each of transmission antennas;
a propagation-path-gain calculating unit that calculates propagation path gains of the transmission antennas on the basis of an estimation result of the propagation-path estimating unit and further calculates a sum of the calculated propagation path gains;
a first operation unit that calculates a 1/square root of the sum of the propagation path gains;
a delay unit that delays a reception signal;
a power calculating unit that calculates electric power of the reception signal after being delayed by the delay unit;
a second operation unit that calculates a 1/square root of the electric power; and
a differential-space-time decoding unit that performs differential space-time decoding on the basis of the reception signal, the reception signal after being delayed by the delay unit, an operation result in the first operation unit, and an operation result in the second operation unit and estimates the transmission symbol generated by the radio transmission apparatus.

6. The radio reception apparatus according to claim 4, wherein the transmission-symbol estimating unit includes:
a propagation-path estimating unit that independently estimates a propagation path response for each of transmission antennas;
a propagation-path-gain calculating unit that calculates propagation path gains of the transmission antennas on the basis of an estimation result of the propagation-path estimating unit and further calculates a sum of the calculated propagation path gains;
a delay unit that delays a reception signal;
a power calculating unit that calculates electric power of the reception signal after being delayed by the delay unit;
a multiplying unit that multiplies together a sum of the propagation path gains and the electric power;
an operation unit that calculates a 1/square root of a multiplication result in the multiplying unit; and
a differential-space-time decoding unit that performs differential space-time decoding on the basis of the reception signal, the reception signal after being delayed by the delay unit, and an operation result in the operation unit and estimates the transmission symbol generated by the radio transmission apparatus.

7. The radio reception apparatus according to claim 5, wherein the propagation-path-gain calculating unit calculates, through interpolation processing, a sum of the propagation path gains in a section in which a known signal usable for estimation of a propagation path response is not transmitted.

8. The radio reception apparatus according to claim 4, wherein the radio reception apparatus includes a plurality of reception antennas and diversity-combines reception demodulated symbols, which are demodulation results of reception signals in the reception antennas.

9. The radio reception apparatus according to claim 6, wherein the propagation-path-gain calculating unit calculates, through interpolation processing, a sum of the propagation path gains in a section in which a known signal usable for estimation of a propagation path response is not transmitted.

10. The radio reception apparatus according to claim 7, wherein the radio reception apparatus includes a plurality of reception antennas and diversity-combines reception demodulated symbols, which are demodulation results of reception signals in the reception antennas.

11. The radio reception apparatus according to claim 9, wherein the radio reception apparatus includes a plurality of reception antennas and diversity-combines reception demodulated symbols, which are demodulation results of reception signals in the reception antennas.

12. A data transmission method in which a radio transmission apparatus including a plurality of transmission antennas subjects information bits to differential coding and transmits the information bits, the data transmission method comprising:
generating a start symbol as a reference signal during a start of differential coding;
subjecting a transmission symbol, to which information bits are mapped, to differential coding and generating a symbol after differentiation;
subjecting the start symbol or the symbol after differentiation to space-time coding and generating signals to be transmitted from transmission antennas; and
transmitting the signals generated in the space-time coding step from the plurality of transmission antennas, wherein
in the differential coding, electric power of the symbol after differentiation generated in current differential coding processing is determined on the basis of electric power of the start symbol or electric power of the symbol after differentiation generated last time,
wherein the differential coding includes:
calculating electric power of the start symbol or the symbol after differentiation generated last time;
calculating 1/square-root of the electric power; and
generating the symbol after differentiation on the basis of the transmission symbol, the start symbol or the symbol after differentiation generated last time, and the 1/square-root of the electric power.

* * * * *